United States Patent
Ishizuka et al.

[11] Patent Number: 6,151,185
[45] Date of Patent: Nov. 21, 2000

[54] POSITION DETECTING APPARATUS, POSITIONING APPARATUS, AND INFORMATION RECORDING APPARATUS USING THE SAME

[75] Inventors: Kou Ishizuka, Ohmiya; Hidejiro Kadowaki, Yokohama; Makoto Takamiya, Tokyo, all of Japan

[73] Assignee: Canon Kabushiki Kaisha, Tokyo, Japan

[21] Appl. No.: 08/923,528

[22] Filed: Sep. 4, 1997

[30] Foreign Application Priority Data

Sep. 5, 1996 [JP] Japan .................................. 8-235117
Nov. 11, 1996 [JP] Japan .................................. 8-298647

[51] Int. Cl.$^7$ .............................. G11B 5/55; G01B 11/00
[52] U.S. Cl. ....................................... 360/78.04; 356/358
[58] Field of Search .............................. 360/77.02, 77.03, 360/78.04, 78.11, 78.12, 75; 356/27, 28, 28.5, 355, 356, 357, 358; 250/237 G, 234, 236

[56] References Cited

U.S. PATENT DOCUMENTS

| | | | |
|---|---|---|---|
| 3,829,622 | 8/1974 | Elliot | 360/103 |
| 4,466,295 | 8/1984 | Wesson | 73/862.38 |
| 4,678,909 | 7/1987 | Jackson et al. | 250/231 P |
| 4,682,500 | 7/1987 | Uda | 73/705 |
| 4,817,848 | 4/1989 | Gabaldon | 228/102 |
| 5,090,001 | 2/1992 | Ito et al. | 369/44.28 |
| 5,162,955 | 11/1992 | Burdenko | 360/75 |
| 5,172,160 | 12/1992 | Van Eijk et al. | 355/53 |
| 5,283,434 | 2/1994 | Ishizuka et al. | 250/237 G |
| 5,390,022 | 2/1995 | Ishizuka et al. | 356/356 |
| 5,390,423 | 2/1995 | Butter et al. | 33/559 |
| 5,448,358 | 9/1995 | Ishizuka et al. | 356/373 |
| 5,481,106 | 1/1996 | Nyui et al. | 250/237 G |
| 5,483,332 | 1/1996 | Takamiya et al. | 356/28.5 |
| 5,483,377 | 1/1996 | Kaneda et al. | 359/566 |
| 5,498,870 | 3/1996 | Ishizuka | 250/237 G |
| 5,502,466 | 3/1996 | Kato et al. | 356/356 |
| 5,557,396 | 9/1996 | Ishizuka et al. | 356/28.5 |
| 5,569,913 | 10/1996 | Ishizuka et al. | 250/237 |
| 5,610,777 | 3/1997 | Dang et al. | 360/75 |
| 5,612,602 | 3/1997 | Kubota et al. | 360/75 |
| 5,617,267 | 4/1997 | Kawagoe et al. | 360/77.02 |
| 5,621,527 | 4/1997 | Kaneda et al. | 356/356 |
| 5,627,698 | 5/1997 | Malek | 360/75 |
| 5,629,793 | 5/1997 | Takamiya et al. | 359/278 |
| 5,640,239 | 6/1997 | Takamiya et al. | 356/345 |
| 5,663,794 | 9/1997 | Ishizuka | 356/356 |
| 5,666,196 | 9/1997 | Ishii et al. | 356/356 |
| 5,680,211 | 10/1997 | Kaneda et al. | 356/356 |
| 5,774,294 | 6/1998 | Fioravanti | 360/75 |
| 5,796,542 | 8/1998 | Szeremeta | 360/77.02 |

*Primary Examiner*—David L. Ometz
*Attorney, Agent, or Firm*—Fitzpatrick, Cella, Harper & Scinto

[57] ABSTRACT

An apparatus for detecting position change information of an object includes a contact member for contacting the object, and a detecting unit for obtaining position change information of the object by detecting a change in force applied from the object to the contact member.

16 Claims, 15 Drawing Sheets

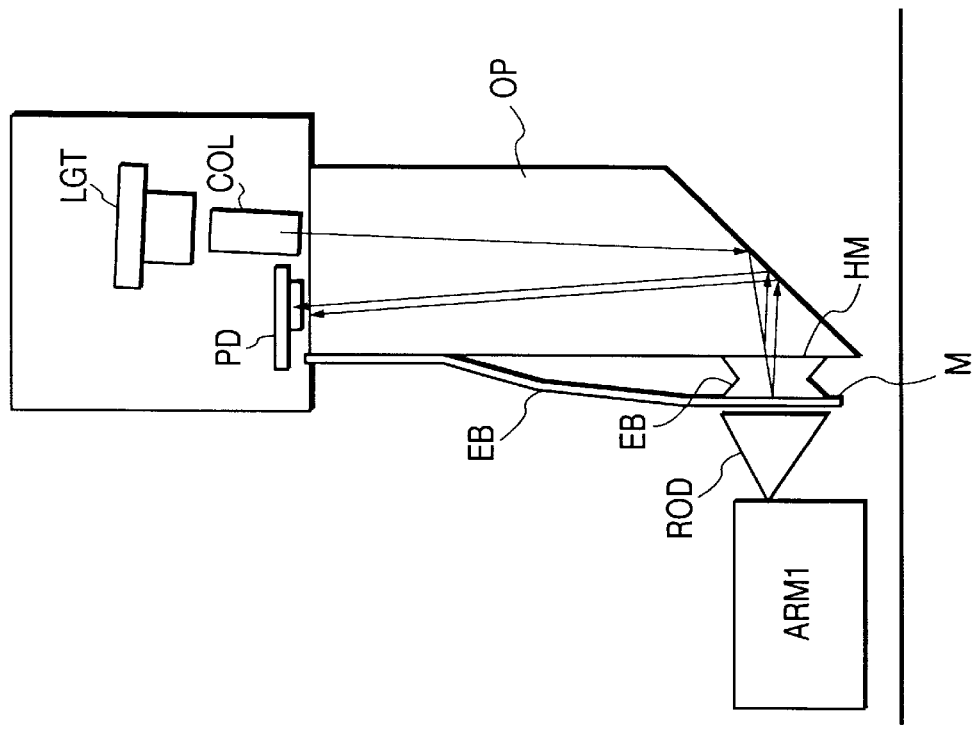
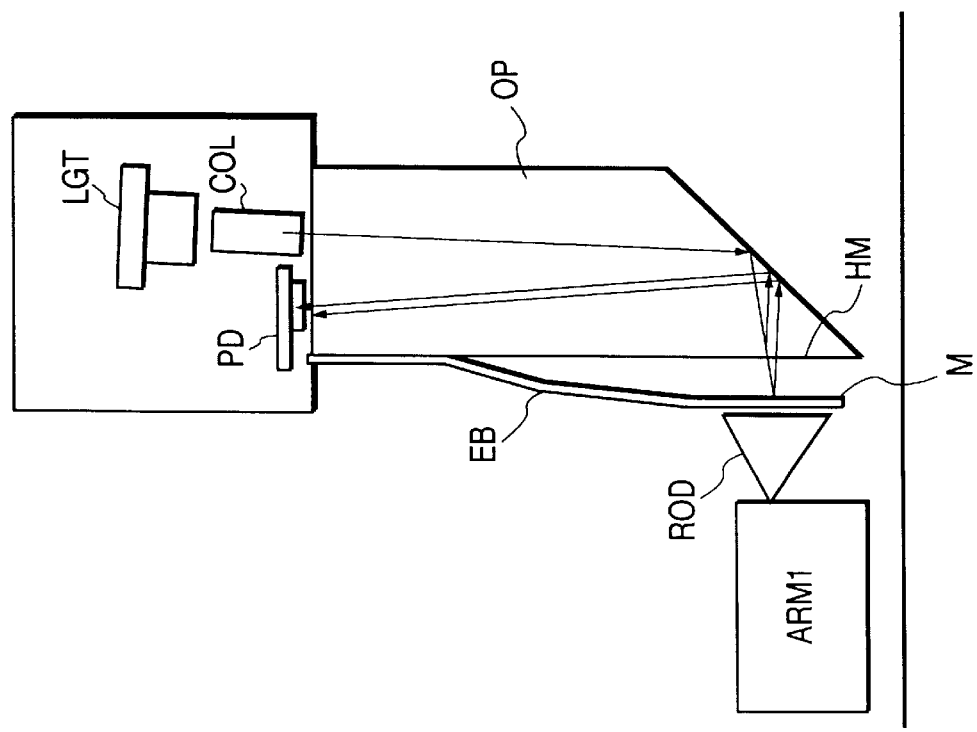

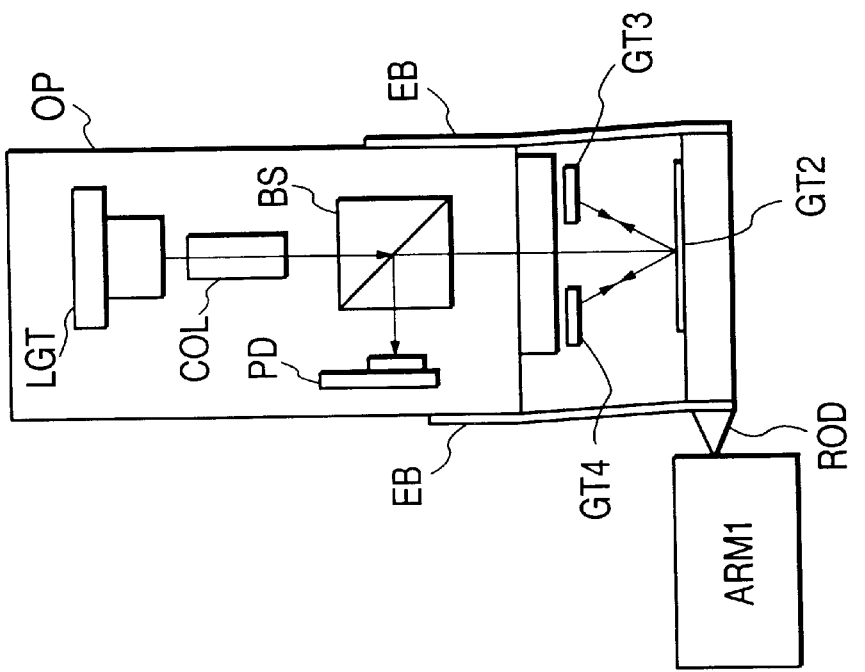
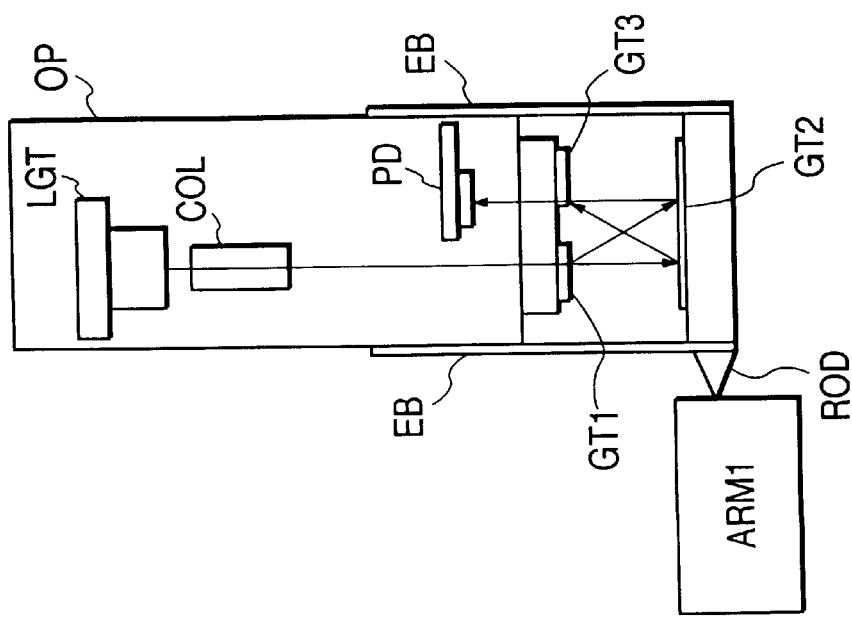

POSITION DETECTING APPARATUS, POSITIONING APPARATUS, AND INFORMATION RECORDING APPARATUS USING THE SAME

BACKGROUND OF THE INVENTION

1. Field of the Invention

The present invention relates to a position detecting apparatus and a positioning apparatus for an object such as a magnetic head of a hard disk drive, and an information recording apparatus using the same. The present invention is particularly preferably applicable to an apparatus for manufacturing a hard disk drive (to be referred to as an HDD hereinafter) for use in a computer, and especially an apparatus for accurately writing a servo track signal in an internal hard disk of an HDD.

2. Related Background Art

FIG. 1 is a view for explaining a conventional apparatus for writing a servo track signal in an internal hard disk of an HDD.

Referring to FIG. 1, a hard disk drive HDD comprises a hard disk HD, a slider SLID, a magnetic head arm ARM, a voice coil VOIC, a spindle OHD of the hard disk HD, and a rotating shaft OARM of the magnetic head arm ARM.

A magnetic recording medium is vapor-deposited on the surface of the hard disk HD. The hard disk HD is constantly rotated at a high speed about the spindle OHD. A magnetic head is arranged close to the surface of the hard disk HD. The magnetic head is incorporated into a substantially rectangular parallelpiped member called the slider SLID attached to the end portion of the arm ARM having the rotational center OARM outside the hard disk HD. The magnetic head can be relatively moved in a substantially radial direction on the hard disk HD by rotating the arm ARM by the voice coil VOIC.

Accordingly, magnetic information can be written in or read out from an arbitrary position (track) on the surface of the hard disk by the rotating hard disk HD and the pivoting magnetic head.

A method of performing magnetic recording on the surface of the hard disk HD is as follows. First, the hard disk is divided into a plurality of concentric annular tracks having different radii with respect to the hard disk rotational center OHD. Each annular track is also divided into a plurality of circular arcs. Finally, information is recorded on and reproduced from a plurality of arcuated regions along the circumferential direction in a time-series manner.

Recently, it is being demanded to increase the recording capacity of a hard disk and therefore increase the density of information to be recorded on a hard disk. As a means for increasing the density of information to be recorded on a hard disk, it is effective to narrow the width of concentrically divided tracks and thereby increase the recording density in the radial direction.

The recording density in the radial direction is expressed by a track density TPI (track/inch) per inch and currently is about 8,000 TPI. This means that the track pitch is approximately 3.125 $\mu$m.

To detect this fine track pitch, it is necessary to position the magnetic head with a resolution of about 1/50 (0.06 $\mu$m) of the track width in the radial direction of the hard disk HD and to write servo track signals beforehand. An important technique in this case is to sequentially write servo track signals while positioning the magnetic head with a high resolution within a short time period.

FIG. 2 is a schematic view showing the structure of a conventional positioning apparatus for writing servo track signals. Referring to FIG. 2, this positioning apparatus comprises a pushrod PROD, an arm ARM2' for the pushrod PROD, an arm ARM1 a positioning motor MO, a rotary encoder RE for detecting the rotational amount of the rotating shaft of the motor MO, a signal processor SP for analyzing the detection output from the rotary encoder RE and generating a positioning command signal for a servo track signal write position of a magnetic head, and a motor driver MD for driving the motor MO in accordance with the command signal from the signal processor SP.

Conventionally, as shown in FIG. 2, the magnetic head arm ARM1 is pressed laterally against the cylindrical surface of the pushrod PROD. While feedback control is performed by a system including the rotary encoder RE, the signal processor SP, and the motor driver MD, the motor MO rotates the arm ARM2' to position the pushrod PROD by sequentially finely feeding it, thereby sequentially writing servo track signals.

Recently, a method assuming more accurate positioning was also invented. This method accurately measures the movement of a magnetic head arm by an optical means, instead of mechanically pressing the magnetic head arm. FIG. 3 shows an example of an apparatus of this sort.

Referring to FIG. 3, this apparatus comprises a laser light source LA, a mirror M, a beam splitter BS, a retroreflector CC such as a corner cube provided on the magnetic head arm ARM1, and a photodetector PD.

In this apparatus, the laser light source LA, the mirror M, the beam splitter BS, and the retroreflector CC constitute a Michelson interferometer. The photodetector PD detects the interference light of light beams L1 and L2 propagating via the retroreflector CC and the mirror M, respectively, and obtains position information of the magnetic head arm ARM1. On the basis of the obtained detection signal, the signal processor SP generates a command to control a current flowing from a voice coil motor driver VCMD to a voice coil VOIC, thereby directly moving and appropriately controlling the magnetic head arm. Consequently, even if the press force of the pushrod PROD varies due to, e.g., vibrations while the hard disk is being rotated and the position of the slider SLID moves from an accurate position, this movement is corrected to maintain accurate head positioning.

In such an apparatus, however, the retroreflector CC such as a corner cube must be mounted on the magnetic head arm. This readily poses a problem of securing the space or a problem of a change in the gap between the slider and the hard disk caused by an increase in weight.

SUMMARY OF THE INVENTION

The present invention has been made in consideration of the above conventional situation, and has as its object to provide a position detecting apparatus and a positioning apparatus capable of detecting the position of an object and positioning the object with a high reliability without providing any large member on the object, and to provide an information recording apparatus using the same.

BRIEF DESCRIPTION OF THE DRAWINGS

FIG. 7 is a view for explaining one modification;

FIG. 8 is a view for explaining another modification;

FIG. 13 is a view for explaining still another modification;

FIG. 14 is a view for explaining still another modification;

DESCRIPTION OF THE PREFERRED EMBODIMENTS

Figure 1:
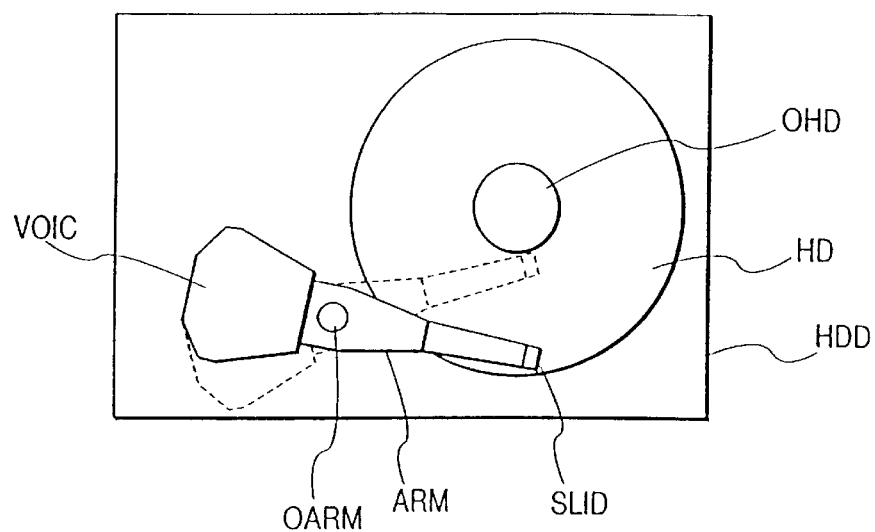
FIG. 1 is a view showing a hard disk driver.
Figure 2:
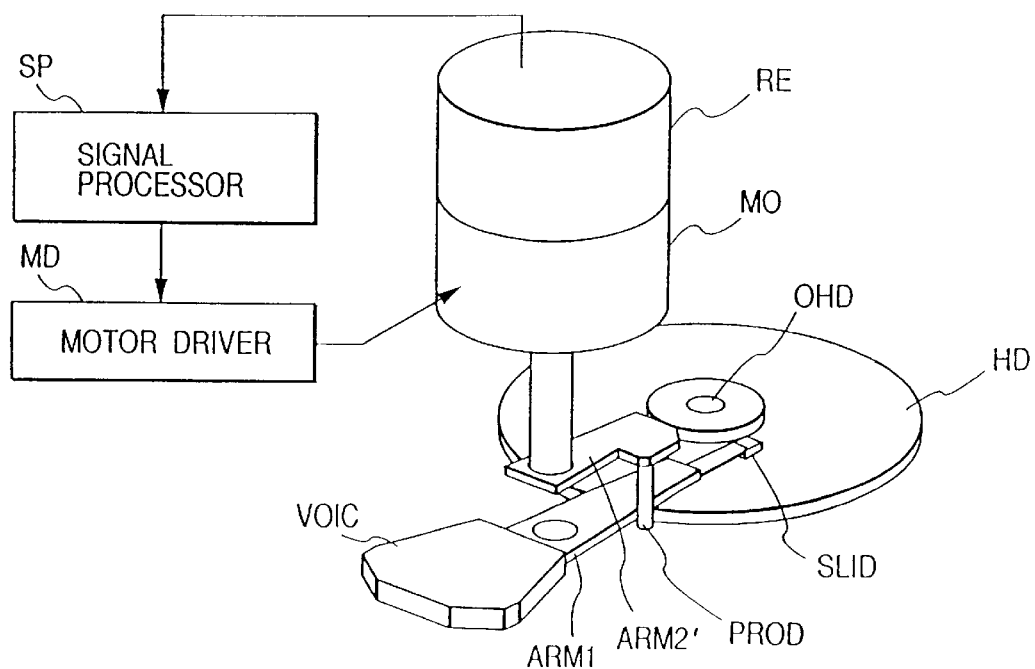
FIG. 2 is a view for explaining a conventional servo track signal writing apparatus using a pushrod.
Figure 3:
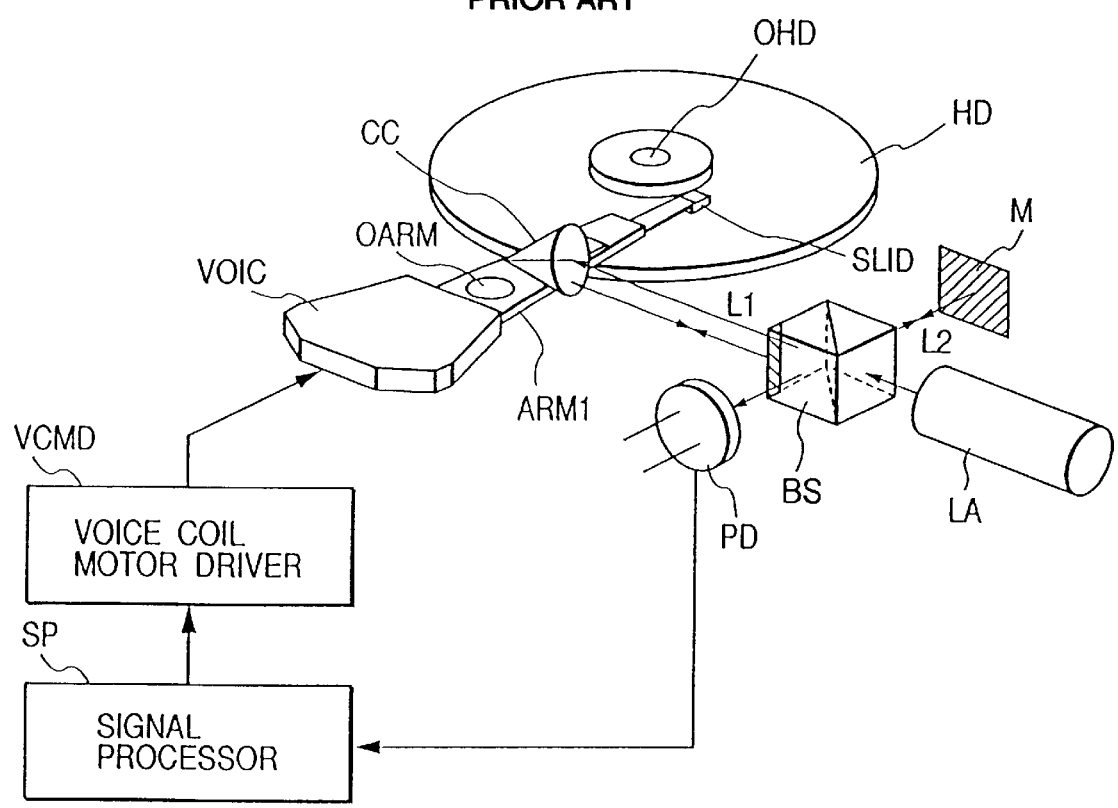
FIG. 3 is a view for explaining a conventional servo track signal writing apparatus using a non-contact interference distance measuring system.
Figure 4:
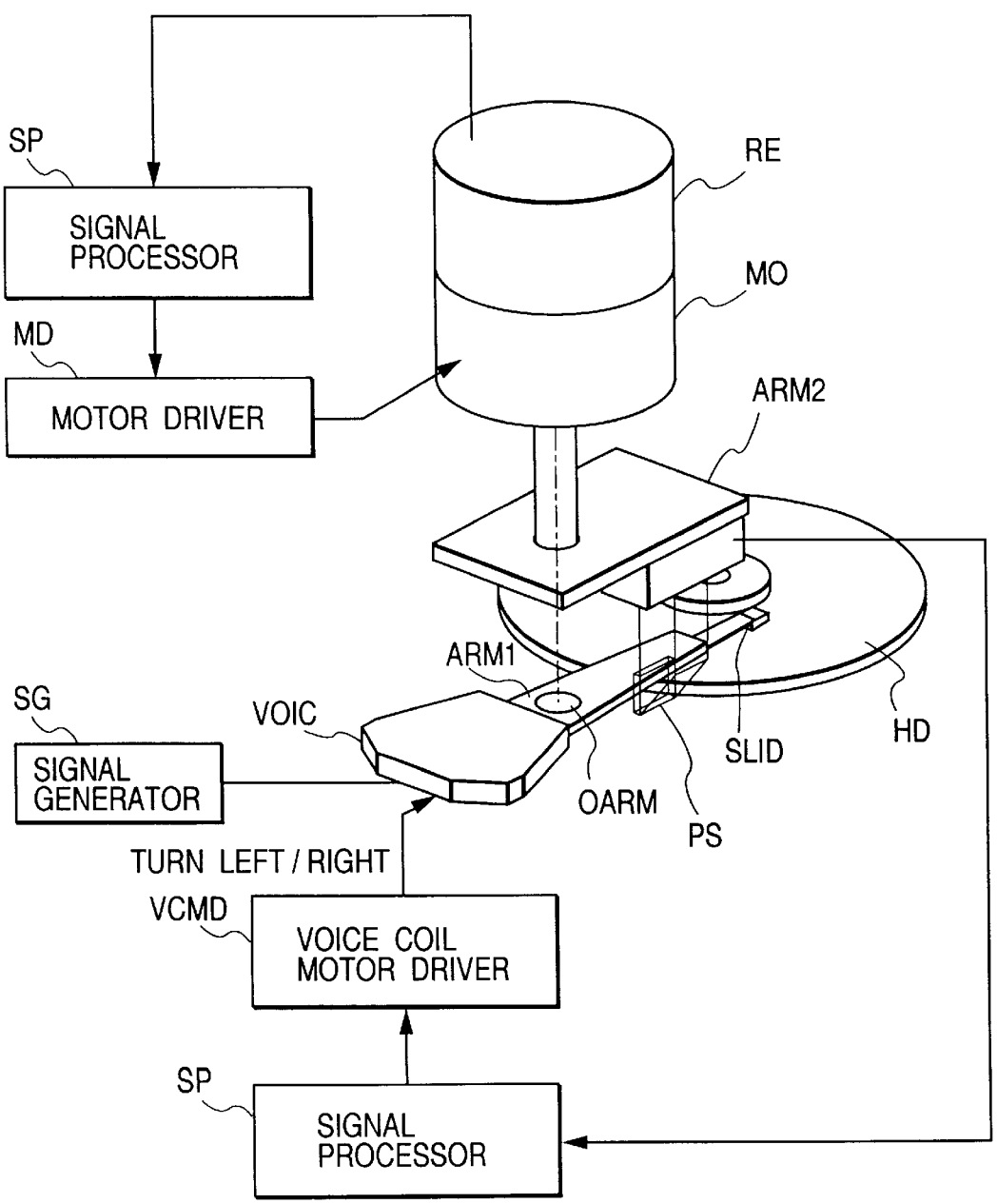
FIG. 4 is a schematic view for explaining the first embodiment of the present invention.

FIG. 4 is a schematic view showing the construction of a servo track signal writing apparatus according to the first embodiment of the present invention. In FIG. 4, the same reference symbols as described previously denote the same parts.

A hard disk drive HDD includes a magnetic head arm ARM1 having a rotating shaft outside a hard disk HD. A slider SLID attached to the end portion of the magnetic head arm ARM1 is arranged to oppose the hard disk surface with a gap of a few $\mu$m (or less) between them. The slider SLID is pivoted when the magnetic head arm ARM1 rotates. The rotation is done by passing a current through a voice coil VOIC.

An apparatus with such a construction is arranged in a spatially appropriate position, as shown in FIG. 4, with respect to the hard disk drive HDD including the hard disk HD, the slider SLID, the magnetic head arm ARM1, and the voice coil VOIC.

A signal generator SG generates a servo track signal to be written in the hard disk. This servo track signal is written in the hard disk via the magnetic head of the slider SLID.

A force sensor unit PS is placed on a probe-like support member of a support arm ARM2 and inserted inside the hard disk drive HDD. The support arm ARM2 is so arranged as to be rotatable by a rotating shaft coaxial with a rotational center OARM of the magnetic head arm ARM1. The rotational position of the force sensor unit PS is detected by a high-resolution rotary encoder RE attached to the rotating shaft of the support arm ARM2. On the basis of this detection datum, a signal processor SP drives a motor MO via a motor driver MD. The rotational position of the force sensor unit PS is determined by feedback control in this form.

The force sensor unit PS is constituted by an optical force sensor unit as will be described below.

Figure 5:
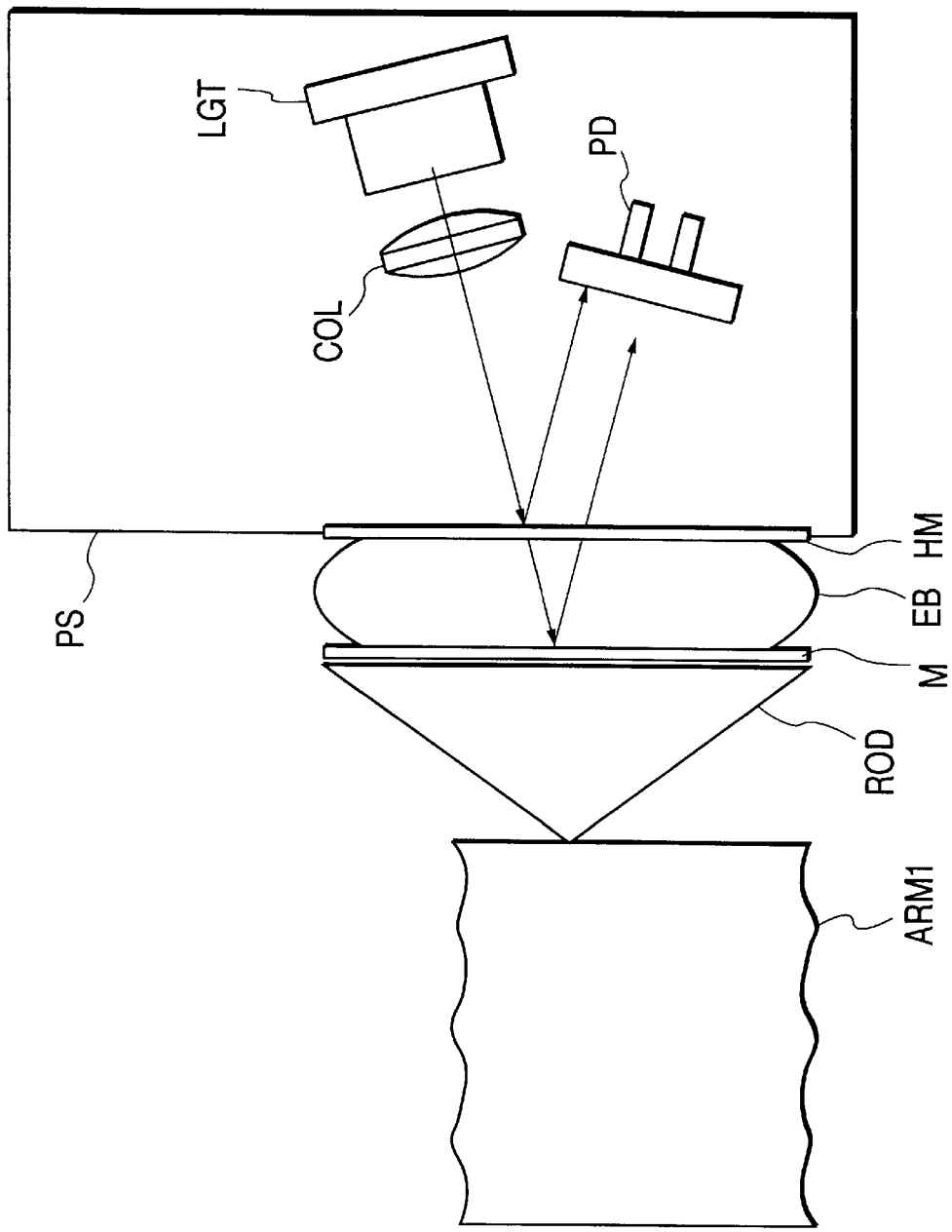
FIG. 5 is a view for explaining the principle of a force sensor unit in the first embodiment of the present invention.
Figure 6:
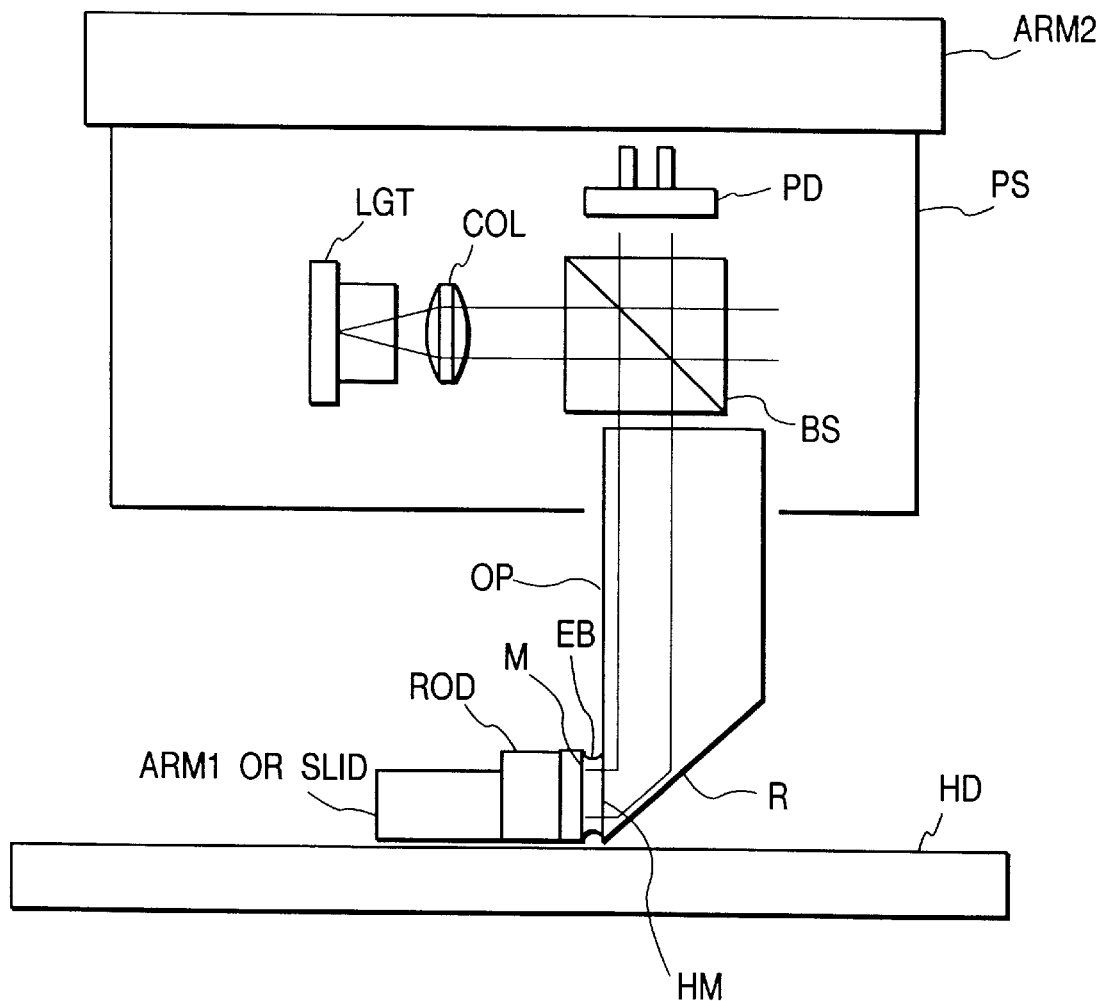
FIG. 6 is a schematic side view of the force sensor unit in the first embodiment of the present invention.

FIG. 5 is a view for explaining the principle of the optical force sensor unit. FIG. 6 is a schematic side view of the optical sensor unit. As shown in FIGS. 5 and 6, this optical sensor unit comprises a coherence light source LGT, a half mirror HM, an elastic base EB, a mirror M, and a photoelectric device PD. One surface of a prism OP is coated with an optically transparent resin having a thickness of several tens of $\mu$m to several hundred $\mu$m, and the fine mirror M is adhered to the resin. The interface between the prism OP and the resin as the elastic base EB becomes a half-mirror surface if there is a difference between the refractive indices. It is also possible to previously vapor-deposit a semi-reflecting film on the side of the prism OP.

Divergent light from the coherence light source LGT such as a laser diode is collimated into a substantially parallel light beam by a collimator lens COL. The light beam is divided into transmitted light and reflected light by the half mirror HM formed on the surface of the prism OP (actually, after being reflected by a beam splitter BS, the light propagates through the prism OP, and is reflected by a reflecting surface R as shown in FIG. 6). The reflected light returns to the half mirror HM through the original optical path. The transmitted light is emitted toward the mirror M on the surface of a projection ROD formed on the prism OP through the elastic base EB. The reflected light from the mirror M returns to the half mirror HM through the original optical path. These two light beams interfere with each other, and the interference light beam is received by the photoelectric device PD (actually, after being transmitted through the beam splitter BS as shown in FIG. 6). The projection ROD is in loose contact with the side surface of the magnetic head arm ARM1 or with the side surface of the slider SLID. When the elastic base EB deforms due to the contact force and the mirror M moves on the order of the wavelength of light, the optical path length between the half mirror HM and the mirror M changes. This changes the phase of the brightness of the interference light of two light beams synthesized by the half mirror HM. When the mirror M is moved by the contact force, the brightness changes by one period each time the optical path length by which the light goes and returns between the half mirror HM and the mirror M changes by the wavelength of the light source.

That is, when a semiconductor laser with a wavelength of 0.78 $\mu$m is used as a light source, the brightness changes in the form of a sine wave by one period if the distance between the half mirror HM and the mirror M changes by 0.39 $\mu$m. This change in brightness is converted into an electrical signal by the photoelectric device PD. If the contact force is initially set at a value corresponding to an intermediate brightness, the electrical signal level changes most sensitively when the contact force (distance) to the side surface of the magnetic head arm ARM1 or the slider SLID changes. This is optimum as an interference force (distance) sensor. Note that the contact force F and the moving amount of the mirror M have a proportional relationship having an elastic constant k of the elastic base EB as a coefficient, and this elastic constant depends upon the material, shape, and dimensions (e.g., area and thickness) of the elastic base.

In a conventional servo track signal writing apparatus, the side surface of a magnetic head arm is pressed with a pressure of about 10 g by a pushrod press method. In this embodiment, however, servo control is so performed as to hold the force constant such that the side surface of the magnetic head arm is moved about 1 μm with a pressure of about 1 g.

As long as the projection ROD of the optical force sensor unit PS is in contact with the side surface of the magnetic head arm ARM1 or the side surface of the slider SLID, the distance between the mirror and the internal interference optical apparatus is changed by the contact force. When the projection ROD is contacting the side surface of the magnetic head arm ARM1 or the side surface of the slider SLID, the internal mirror M of the force sensor is moved by the contact pressure to modulate the phase of the wave front of the reflected light. A change in brightness of the interference light of this reflected light is detected by the internal light-receiving device PD of the optical force sensor unit. By using a change in sine-wave electrical signal, caused by the interference between the reflected light from the mirror M and the reflected light from the half mirror HM, a change in distance can be detected with a resolution of about 0.01 μm by a known electric circuit having a resolution by which one sine wave (0.39 μm) can be divided into several ten phases.

On the basis of this electrical change, the signal processor SP performs feedback control for the current to the voice coil VOIC via a voice coil motor driver VCMD. Consequently, the distance between the half mirror HM and the mirror M can be held at a fixed value with a resolution of 0.01 μm. Since the arm ARM1 and the mirror M are in contact with each other, the distance between the magnetic head arm and the half mirror HM can be indirectly held constant with a resolution of about 0.01 μm.

That is, when the contact pressure to the arm ARM1 is held constant by controlling the current to the voice coil VOIC, the phase of the reflected light is also in a specific state. The position of the reflecting mirror M is measured by the interference optical system described above, and a current is passed through the voice coil VOIC so that a fixed state is held, thereby performing servo control by which the magnetic head arm ARM1 is moved. Consequently, the magnetic head arm can be indirectly finely moved and positioned with a resolution of about 0.01 μm.

If the projection ROD as a portion in contact with the magnetic head arm ARM1 is slightly moved laterally while being rotated, the force can vary due to the influence of the surface roughness of the side surface of the magnetic head arm ARM1. As the projection ROD, therefore, a semi-cylindrical member can also be integrated with the mirror M so that a smooth cylindrical surface comes in contact.

By using the above components, non-contact fine positioning is performed by the following procedures.

First, the optical non-contact distance sensor unit PS is fixed to an initial position by using the external motor MO and the rotary encoder RE. Subsequently, a current is passed through the voice coil VOIC to bring the optical non-contact distance sensor unit PS into contact with the side surface of the arm ARM1. Consequently, the optical force sensor unit PS outputs a periodic signal indicating that a distance x between the internal mirror and the interference optical system main body is changing. Assuming the contact force is F and the elastic constant of the elastic base EB is k, the current to the voice coil VOIC is so controlled that the mirror comes to a position x where x=F/k holds.

Subsequently, under the control of the signal processor SP, the optical non-contact distance sensor unit PS is rotated through a minute angle by using the external motor MO and the rotary encoder RE. Consequently, a signal indicating that the contact force between the optical force sensor unit PS and the magnetic head arm ARM1 or the slider SLID has changed is output.

Accordingly, the current to the voice coil VOIC fixed to the base of the magnetic head arm ARM1 is changed to rotate the magnetic head arm. The optical force sensor unit PS outputs a signal indicating that the contact force is again changing. If it is determined on the basis of the signal from the optical force sensor unit PS that the initial state is restored, the mutual contact force has returned to the original state. At this timing, the control current to the voice coil VOIC is stopped.

By repeating the above procedures at a high speed, the magnetic head arm ARM1 (the slider SLID) can be finely fed and accurately positioned in a non-contact state in synchronism with accurate positioning and fine feeding of the optical force sensor unit PS. With this arrangement, a high-density servo track signal writing apparatus can be realized by repetitively writing a servo track signal in the hard disk for each stoppage. Note that an actual positioning procedure need not be performed by the divided procedures as described above. That is, the magnetic head arm may also be moved so as to follow the movement of the optical force sensor unit on the basis of an optimum control theory.

In the above embodiment (FIGS. 4, 5, and 6), the half mirror HM and the mirror M are used to constitute a Fizeau interferometer type interference distance measuring apparatus and measure the force (i.e., distance) with a high resolution. However, a Michelson interference optical system and the like may also be used.

Also, when a cylindrical surface is used as the shape of the projection ROD as a portion of the force sensor PS in contact with the magnetic head arm ARM1, the projection ROD can be a single plano-convex cylindrical lens. If this is the case, it is only necessary to form the mirror M by vapor-depositing a reflecting film on the planar surface of the cylindrical lens and join the mirror M to the elastic resin layer EB.

Modifications of the first embodiment will be described below. In the following explanation, the parts except for the optical force sensor unit PS are the same as in the first embodiment. Therefore, only the optical force sensor unit PS will be described below with reference to the accompanying drawings, and the rest will be omitted.

FIG. 7 shows a modification in which the elastic base EB of the force sensor unit PS is formed by using a leaf-spring member.

FIG. 8 shows a modification in which the elastic base EB of the force sensor PS is formed by using both a leaf-spring member and a resin member. The leaf-spring member gives an appropriate elastic constant and suppresses an unnecessary horizontal displacement of the mirror. The elastic resin suppresses an unnecessary resonance mode.

Figure 9:
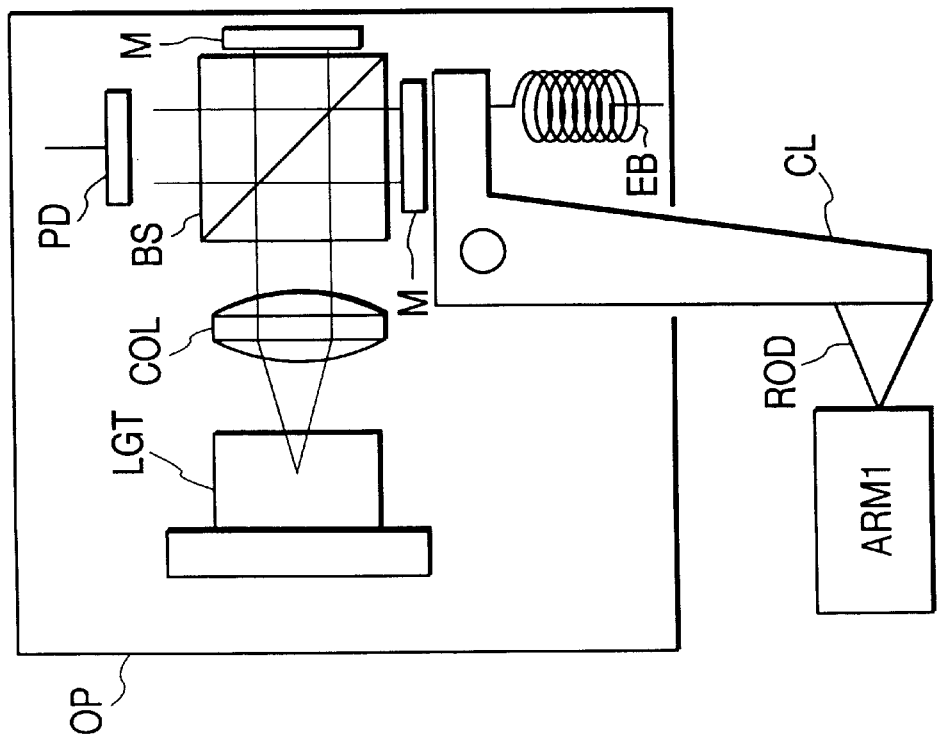
FIG. 9 is a view for explaining still another modification.

FIG. 9 shows a modification in which force is transmitted from the projection ROD to the force sensor unit PS via a cantilever member CL, and the elastic base EB of the force sensor unit PS is formed by using a coil-spring member. Additionally, the interference measuring apparatus is formed by a Michelson interferometer including a cantilever and a mirror arranged in a fixed portion. In this modification, the force can be increased or decreased in accordance with a dimension, e.g., the arm length of the cantilever CL.

Figure 10:
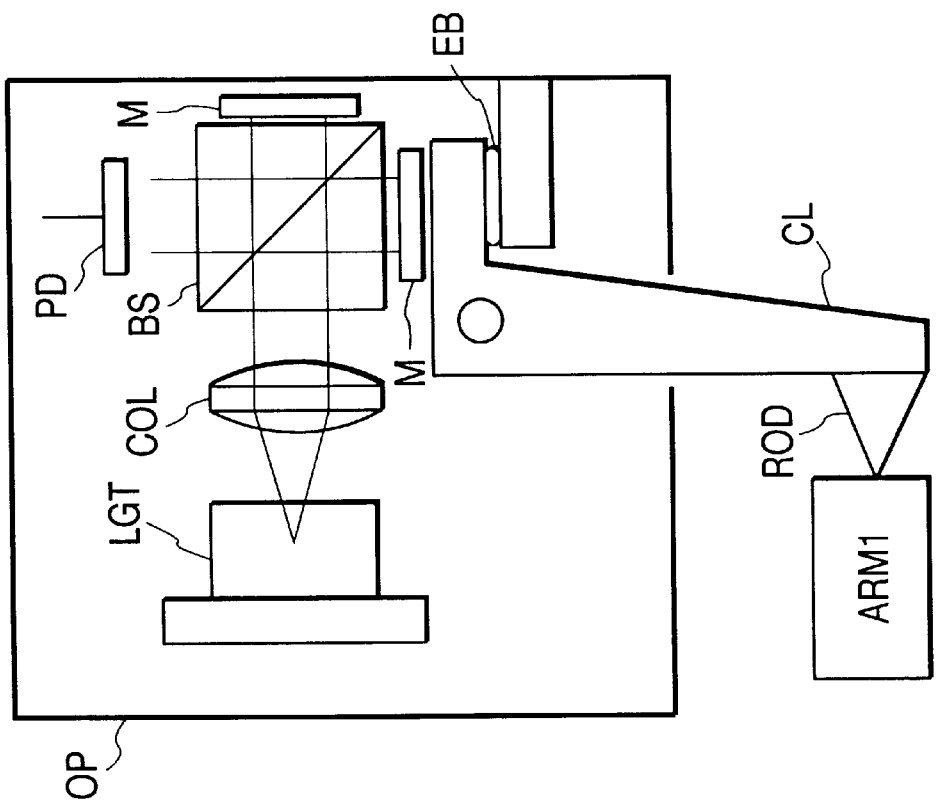
FIG. 10 is a view for explaining still another modification.

FIG. 10 shows a modification in which the elastic base EB of the force sensor unit PS in FIG. 9 is replaced with a resin elastic member.

FIGS. 11, 12, 13, and 14 show modifications in each of which the Fizeau interferometer of the first embodiment is replaced with a grating interferometer.

Figure 11:
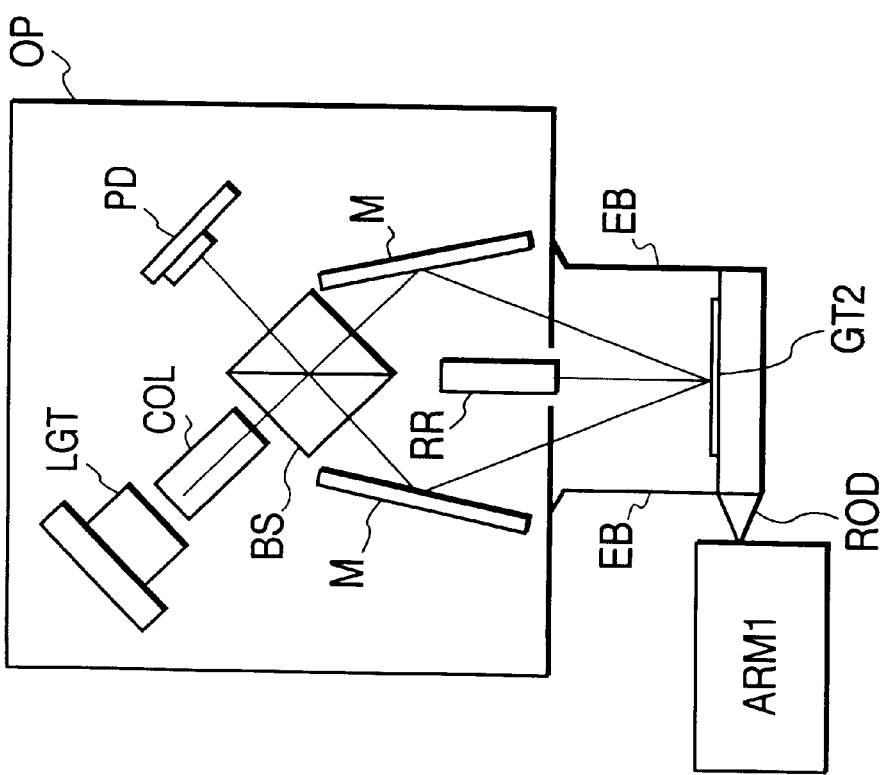
FIG. 11 is a view for explaining still another modification.

In the modification shown in FIG. 11, the optical force sensor unit PS includes the coherence light source LGT, the beam splitter BS, the mirrors M, the retroreflector RR such as a cat's eye, a movable diffraction grating scale GT2, and the photoelectric device PD.

Divergent light from the coherence light source LGT such as a laser diode is collimated into a substantially parallel light beam by the collimator lens COL and split into two light beams by the beam splitter BS. The mirrors M bend the two optical paths to emit the light beams toward the diffraction grating scale GT2 fixed to the elastic base EB which supports the projection ROD. Two reflected diffracted light beams R+ and R− having different diffraction orders from the diffraction grating scale GT2 are guided to an optical path to the retroreflector RR and returned to the original optical path by the retroreflector RR. The light beams are again diffracted by the diffraction grating scale GT2. The wave fronts of the diffracted light beams, R++ and R−−, are overlapped by the beam splitter BS via the mirrors M, forming an interference signal.

When the diffraction grating scale GT2 moves by one grating pitch, the phase of the wave front of the diffracted light R+ is shifted by $+2\pi$, the phase of the wave front of the diffracted light R− is shifted by $-2\pi$, the phase of the wave front of the diffracted light R++ is shifted by $+4\pi$, and the phase of the front wave of the diffracted light R−− is shifted by $-4\pi$. The relative phase difference between the light beams R++ and R−− synthesized by the beam splitter BS is $8\pi$. That is, while the diffraction grating scale moves by one pitch, the brightness of the interference light changes by four periods in the form of a sine wave.

The projection ROD integrated with the diffraction grating scale GT2 is in loose contact with the side surface of the magnetic head arm ARM1 or the side surface of the slider SLID. Therefore, when the elastic base EB deforms due to the contact force and the grating scale moves by one diffraction grating pitch, the brightness changes by four periods. When the pitch of the diffraction grating scale is 1.6 $\mu$m, the period of the brightness signal is 0.4 $\mu$m.

By this change in the sine-wave electrical signal caused by interference, a change in the distance can be detected with a resolution of about 0.01 $\mu$m by a known electrical circuit having a resolution by which one sine wave (0.4 $\mu$m) can be divided into several ten phases. By controlling the current to the voice coil on the basis of this detection result as described previously, the relative lateral difference between the grating interference optical system and the diffraction grating scale can be held at a fixed value with a resolution of 0.01 $\mu$m. As a consequence, since the arm ARM1 and the scale diffraction grating are contacting each other via the projection ROD, the distance between the magnetic head arm and the diffraction grating interference optical system can be indirectly held constant with a resolution of about 0.01 $\mu$m.

Figure 12:
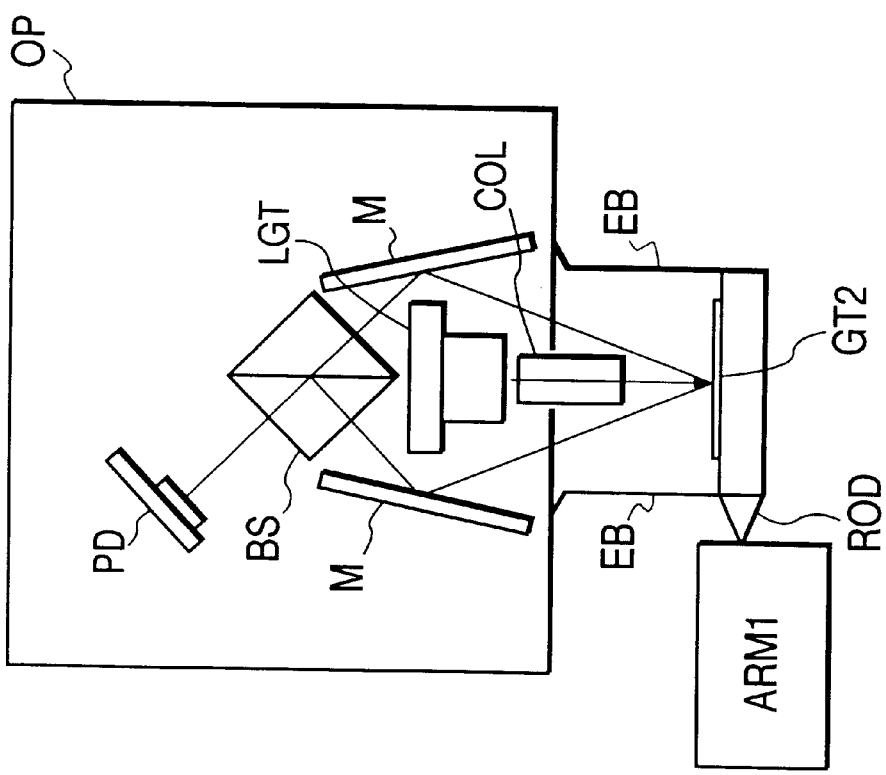
FIG. 12 is a view for explaining still another modification.

The modification shown in FIG. 12 differs from FIG. 11 in that this modification uses an optical system by which +first-order diffracted light R+ and −first-order diffracted light R−, as diffracted light beams from a diffraction grating scale, are made to interfere with each other.

The optical force sensor unit PS includes the coherence light source LGT, the beam splitter BS, the mirrors M, the elastic base EB, a movable diffraction grating scale GT2, and the photoelectric device PD.

Divergent light from the coherence light source LGT such as a laser diode is collimated into a substantially parallel light beam by the collimator lens COL and emitted toward the diffraction grating scale GT2 fixed to the elastic base EB which supports the projection ROD. The wave fronts of two reflected diffracted light beams R+ and R− having different diffraction orders from the diffraction grating scale GT2 are overlapped by the beam splitter BS via the mirrors M to form an interference signal.

When the diffraction grating scale GT2 moves by one grating pitch, the phase of the wave front of the diffracted light R+ is shifted by $+2\pi$, and the phase of the wave front of the diffracted light R− is shifted by $-2\pi$. The relative phase difference between the light beams R+ and R− synthesized by the beam splitter BS is $4\pi$. That is, while the diffraction grating scale moves by one pitch, the brightness of the interference light changes by two periods in the form of a sine wave.

The projection ROD integrated with the diffraction grating scale GT2 is in loose contact with the side surface of the magnetic head arm ARM1 or with the side surface of the slider SLID. Therefore, when the elastic base EB deforms due to the contact force and the grating scale moves by one diffraction grating pitch, the brightness changes by four periods. When the pitch of the diffraction grating scale is 1.6 $\mu$m, the period of the brightness signal is 0.8 $\mu$m.

The modification shown in FIG. 13 uses an optical system by which +first-order diffracted light R+ and −first-order diffracted light R−, as diffracted light beams from a diffraction grating scale, are made to interfere with each other.

The optical force sensor unit includes the coherence light source LGT, diffraction gratings GT1 and GT3, the elastic base EB, a movable diffraction grating scale GT2, and the photoelectric device PD.

Divergent light from the coherence light source LGT such as a light-emitting diode is collimated into a substantially parallel light beam by the collimator lens COL. The light beam is divided into transmitted 0th-order light R0 and transmitted first-order diffracted light R+1. The two light beams are emitted toward the diffraction grating scale GT2 fixed to the elastic base EB which supports the projection ROD. Two reflected diffracted light beams R0, +1 and R+1, −1 having different diffraction orders from the diffraction grating scale GT2 are fed into the same portion of the diffraction grating scale GT3. The diffraction grating scale GT3 makes −first-order diffracted light R0, +1, −1 of the diffracted light R0, +1 and 0th-order diffracted light R+1, −1, 0 of the diffracted light R+1, −1 interfere with each other, while overlapping the wave fronts of these light beams, and emits the interference light as brightness signal light.

When the diffraction grating scale GT2 moves by one grating pitch, the phase of the wave front of the diffracted light R0, +1, −1 is shifted by $+2\pi$, and the phase of the wave front of the diffracted light R+1, −1, 0 is shifted by $-2\pi$. The relative phase difference between the light beams R+ and R− synthesized by the beam splitter BS is $4\pi$. That is, while the diffraction grating scale GT2 moves by one pitch, the brightness of the interference light changes by two periods in the form of a sine wave.

The projection ROD integrated with the diffraction grating scale is in loose contact with the side surface of the magnetic head arm ARM1 or with the side surface of the slider SLID. Therefore, when the elastic base EB deforms due to the contact force and the grating scale moves by one diffraction grating pitch, the brightness changes by four periods. When the pitch of the diffraction grating scale is 1.6 $\mu$m, the period of the brightness signal is 0.8 $\mu$m.

FIG. 14 shows a modification of an optical force sensor whose principle is grating interference which makes diffracted light R++ and diffracted light R−− interfere with each other. This optical force sensor unit includes the coherence light source LGT, the beam splitter BS, diffraction grating reflectors GT3 and GT4, the elastic base EB, a movable diffraction grating scale GT2, and the photoelectric device PD.

Divergent light from the coherence light source LGT such as a laser diode is collimated into a substantially parallel light beam by the collimator lens COL. The light beam is transmitted through the beam splitter and emitted toward the diffraction grating scale GT2 fixed to the elastic base EB which supports the projection ROD. Two reflected diffracted light beams R+ and R− having different diffraction orders from the diffraction grating scale GT2 are guided to optical paths to the diffraction grating reflectors GT3 and GT4 and returned to the original optical paths by these diffraction grating reflectors. The light beams are again diffracted by the diffraction grating scale GT2, and the wave fronts of respective diffracted light beams R++ and R−− are overlapped to form an interference signal. This interference signal is reflected by the beam splitter BS and received by the photoelectric device PD.

When the diffraction grating scale GT2 moves by one grating pitch, the phase of the wave front of the diffracted light R+ is shifted by +2π, the phase of the wave front of the diffracted light R− is shifted by −2π, the phase of the front wave of the diffracted light R++ is shifted by +4π, and the phase of the front wave of the diffracted light R−− is shifted by −4π. The relative phase difference between the light beams R++ and R−− synthesized by the beam splitter BS is 8π. That is, while the diffraction grating scale moves by one pitch, the brightness of the interference light changes by four periods in the form of a sine wave.

The projection ROD integrated with the diffraction grating scale is in loose contact with the side surface of the magnetic head arm ARM1 or with the side surface of the slider SLID. Therefore, when the elastic base EB deforms due to the contact force and the grating scale moves by one diffraction grating pitch, the brightness changes by four periods. When the pitch of the diffraction grating scale is 1.6 μm, the period of the brightness signal is 0.4 μm.

The following various effects are obtained by the above embodiment and its modifications.

(1) Since the position of the slider can be measured and determined with a slight contact, no unnecessary stress is applied to the magnetic disk arm. Therefore, servo track signals on a hard disk can be stably recorded.

(2) Since the optical force sensor using interference of light as its principle is used, the position of the slider can be measured with a high accuracy and a high resolution. Therefore, servo track signals on a hard disk can be recorded by a high density.

(3) The optical force sensor for measuring the position of the slider is supported by the optical probe from a portion above a hard disk plate. Therefore, as in conventional apparatuses using a pushrod, servo track signals can be written by forming an arcuated window in the upper surface of the hard disk drive HDD and inserting the optical probe OP. Accordingly, it is unnecessary to add any special structure to the hard disk drive or limit the arrangement of an electronic substrate so as not to intercept light beams.

(4) Since positioning is basically performed by contact with the magnetic head arm, it is unnecessary to add any special part or structure to the magnetic head arm. Accordingly, the present invention is applicable to magnetic head arms having various sizes and shapes.

Note that as the force sensor, it is also possible to apply an electrooptic device, a strain gauge except for an optical one, and a piezoelectric device.

Figure 15:
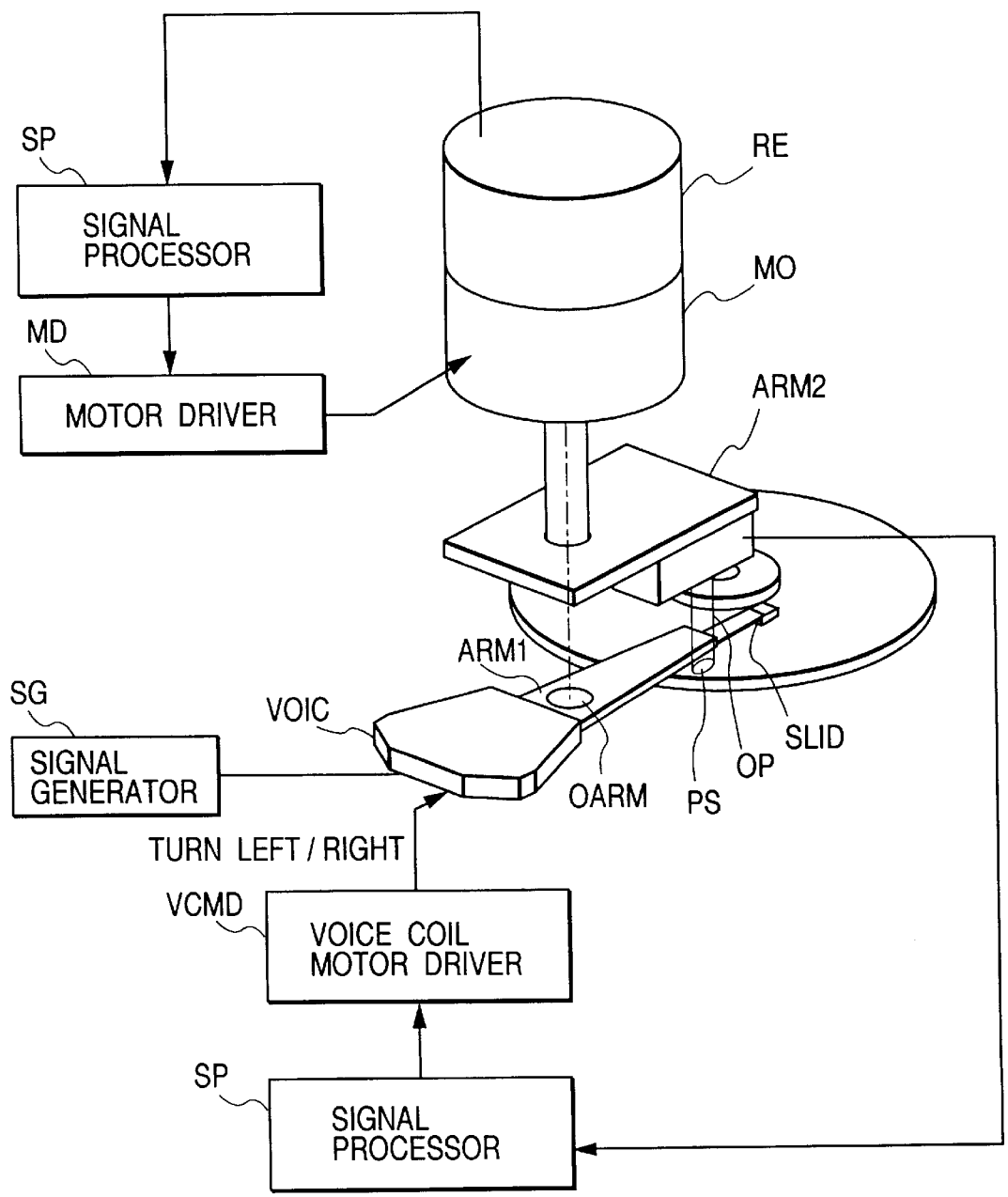
FIG. 15 is a schematic view for explaining the second embodiment of the present invention.

FIG. 15 is a schematic view showing the structure of a servo track signal writing apparatus according to the second embodiment of the present invention. In FIG. 15, the same reference symbols as described above denote the same parts.

A hard disk driver HDD includes a magnetic head arm ARM1 having a rotating shaft outside a hard disk HD. A slider SLID attached to the end portion of the magnetic head arm ARM1 is arranged to oppose the hard disk surface with a gap of a few μm (or less) between them. The slider SLID is pivoted when the magnetic head arm ARM1 rotates. The rotation is done by passing a current through a voice coil VOIC.

An apparatus with such a construction is arranged in a spatially appropriate position, as shown in FIG. 15, with respect to the hard disk drive HDD including the hard disk HD, the slider SLID, the magnetic head arm ARM1, and the voice coil VOIC.

A signal generator SG generates a servo track signal to be written in the hard disk. This servo track signal is written in the hard disk via the magnetic head of the slider SLID.

A force sensor unit PS is placed on a probe-like support member of a support arm ARM2 and inserted inside the hard disk drive HDD. The support arm ARM2 is so arranged as to be rotatable by a rotating shaft coaxial with a rotational center OARM of the magnetic head arm ARM1. The rotational position of the force sensor unit PS is detected by a high-resolution rotary encoder RE attached to the rotating shaft of the support arm ARM2. On the basis of this detection data, a signal processor SP drives a motor MO via a motor driver MD. The rotational position of the force sensor unit PS is determined by feedback control in this form.

The force sensor unit PS is constituted by an optical force sensor unit as will be described below.

Figure 16:
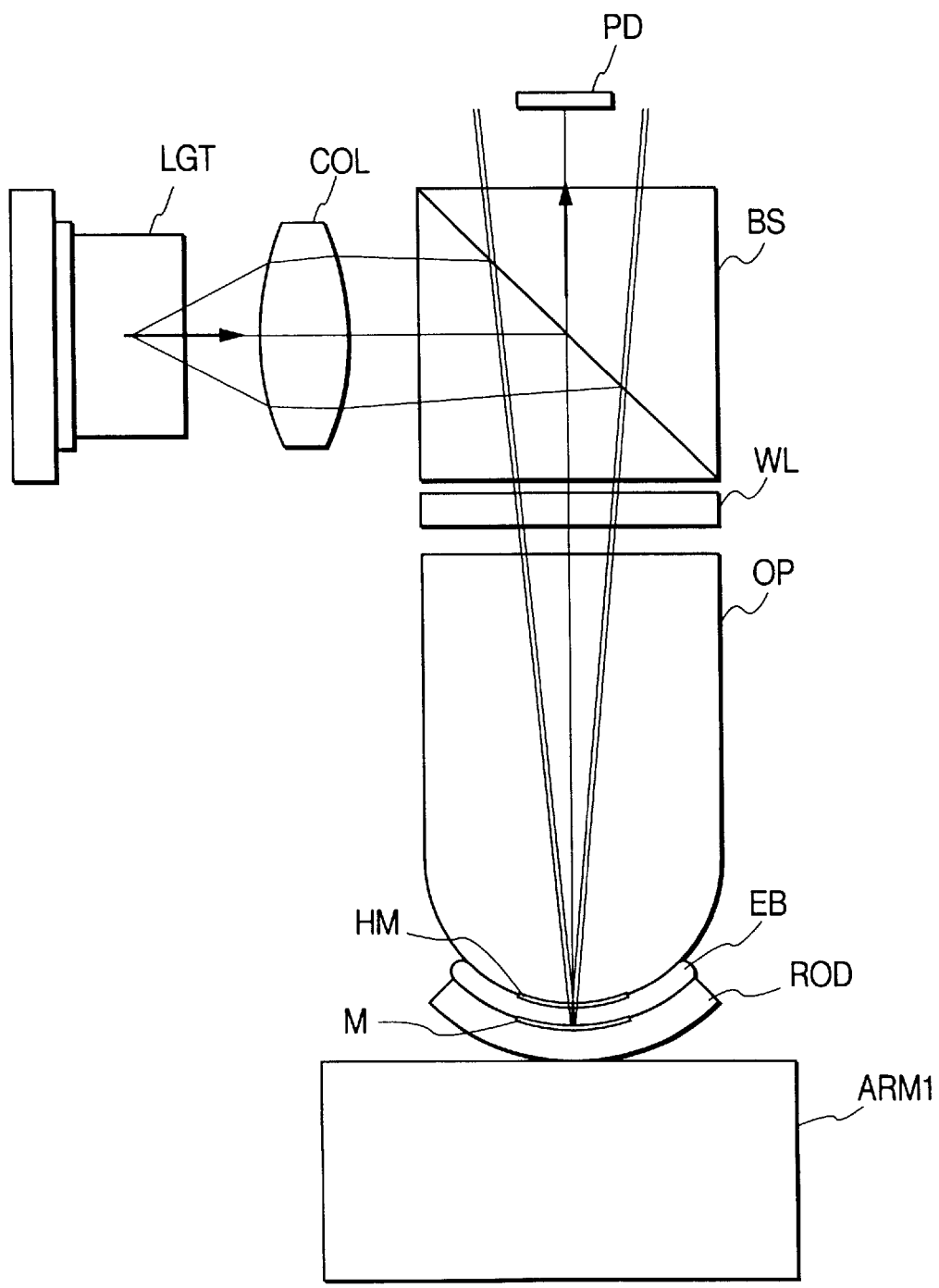
FIG. 16 is a view for explaining the principle of a force sensor unit in the second embodiment of the present invention.
Figure 17:
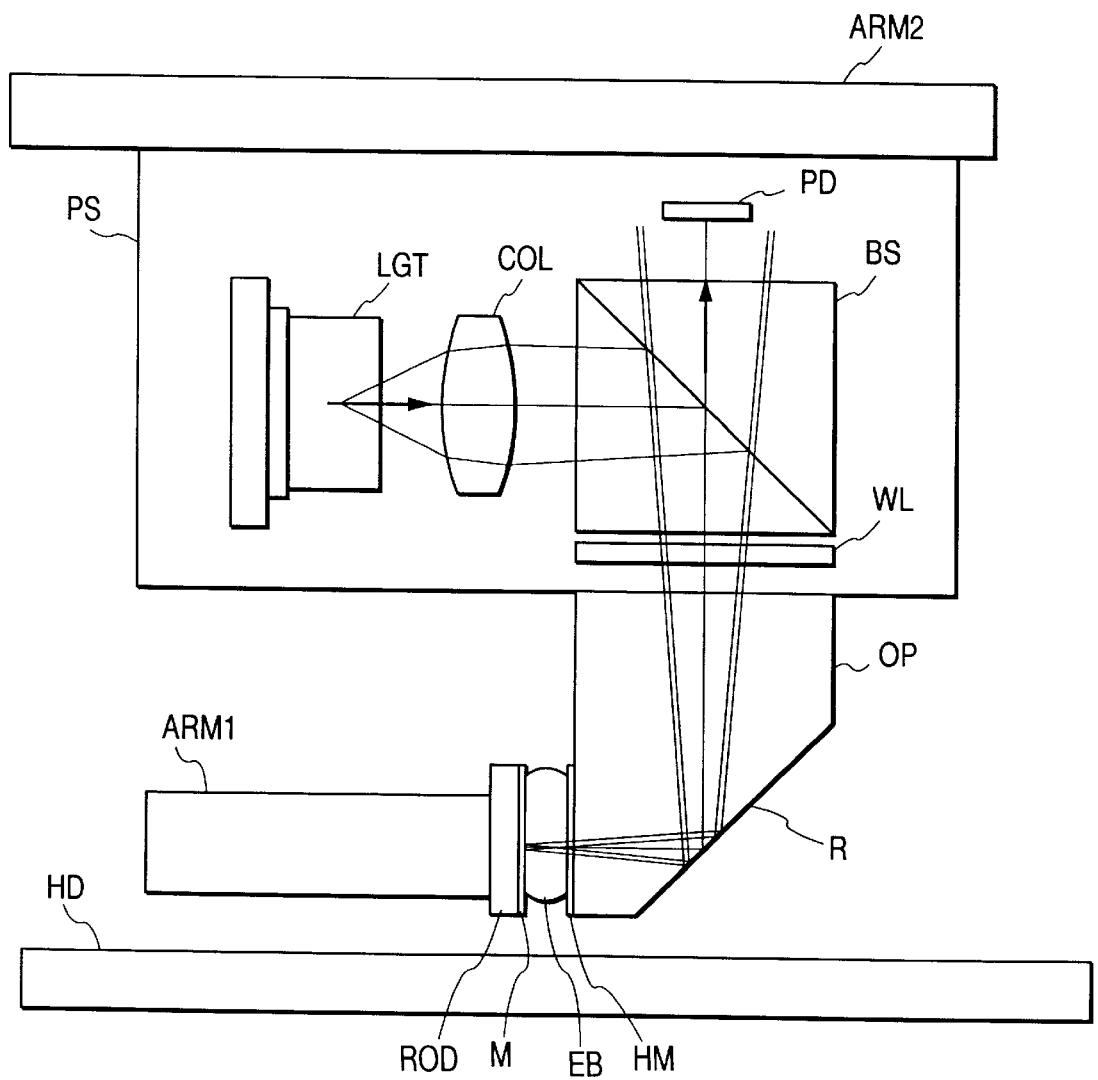
FIG. 17 is a schematic side view of the force sensor unit in the second embodiment of the present invention.
Figure 18:
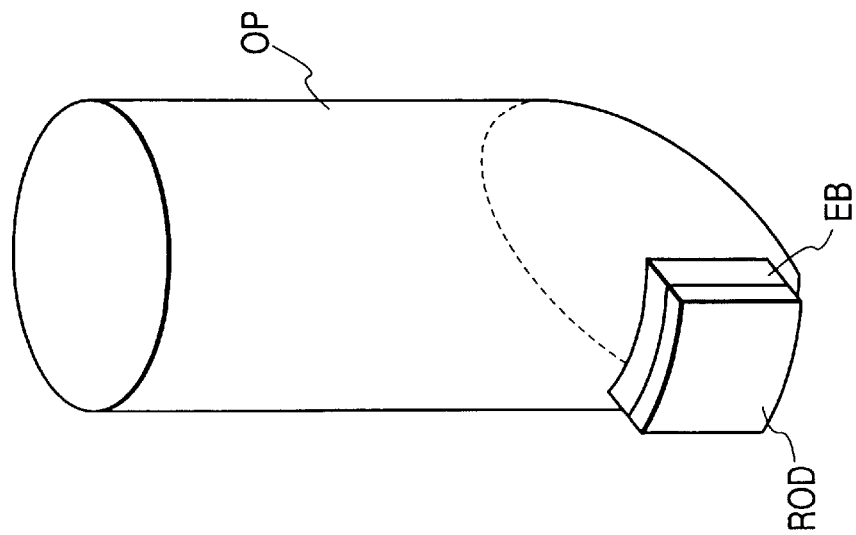
FIG. 18 is a perspective view of an optical probe in the second embodiment of the present invention.

FIG. 16 is a view for explaining the principle of the optical sensor unit. FIG. 17 is a schematic side view of the optical sensor unit. FIG. 18 is a perspective view of an optical probe. As shown in FIGS. 16 and 17, this optical sensor unit includes a coherence light source LGT, a half mirror HM, an elastic base EB, a cylindrical concave mirror M, a cylindrical contact member ROD, and a photoelectric device PD. A cylindrical circumferential surface of a columnar glass probe OP, one end face of which is formed by an angle of 45°, is coated with an optically transparent resin having a thickness of several ten μm to several hundred μm, and the cylindrical contact member ROD having an inner surface on which the cylindrical concave mirror M is vapor-deposited is adhered to the resin. The interface between the glass probe OP and the resin as the elastic base EB becomes a half-mirror surface if there is a difference between the refractive indices. It is also possible to previously vapor-deposit a semi-reflecting film on the side of the columnar glass probe OP.

Divergent light from the coherence light source LGT such as a laser diode is collimated into a loosely condensed light beam by a collimator lens COL. The light beam is divided into transmitted light and reflected light by the half mirror HM formed on the circumferential surface of the columnar glass probe OP (actually, after being reflected by a beam splitter BS, the light propagates through the columnar glass probe OP, and is reflected by a reflecting surface R as shown in FIG. 17). The reflected light returns to the beam splitter BS through the original optical path. The transmitted light is substantially focused on the cylindrical concave mirror M inside the cylindrical contact member ROD arranged on the columnar glass probe OP via the elastic base EB. The reflected light from the cylindrical concave mirror M returns to the beam splitter BS through the original optical path. The wave fronts of these two divergent light beams form spherical waves, whose divergent origins are slightly shifted, and interfere with each other. A central portion, which can be regarded as one color, of the interference light beam is received by the photoelectric device PD.

The beam splitter BS is a polarizing beam splitter. The light source LGT emits a light beam of S-polarized light, when viewed from the beam splitter BS. The S-polarized light beam reflected by the beam splitter BS is converted into P-polarized light by going and returning through a quarter-wave plate WL so arranged so that its polarizing direction and polarizing axis form an angle of 45°. Accordingly, the returning light from the columnar glass probe OP passes through the beam splitter BS.

The cylindrical contact member ROD is in loose contact with the side surface of the magnetic head arm ARM1 or with the side surface of the slider SLID. When the elastic base EB deforms due to the contact force and the mirror M moves on the order of the wavelength of light, the optical path length between the half mirror HM and the cylindrical concave mirror M changes. This changes the phase of the brightness of the interference light of two light beams synthesized by the half mirror HM. When the cylindrical concave mirror M is moved by the contact force, the brightness changes by one period each time the optical path length by which the light goes and returns between the half mirror HM and the mirror M changes by the wavelength of the light source.

That is, when a semiconductor laser with a wavelength of 0.78 $\mu$m is used as a light source, the brightness changes in the form of a sine wave by one period if the distance between the half mirror HM and the cylindrical concave mirror M changes by 0.39 $\mu$m. This change in brightness is converted into an electrical signal by the photoelectric device PD. If the contact force is initially set at a value corresponding to an intermediate brightness, the electrical signal level changes most sensitively when the contact force (distance) to the side surface of the magnetic head arm ARM1 or the slider SLID changes. This is optimum as an interference force (distance) sensor. Note that the contact force F and the moving amount of the cylindrical concave mirror M have a proportional relationship having an elastic constant k of the elastic base EB as a coefficient, and this elastic constant depends upon the material, shape, and dimensions (e.g., area and thickness) of the elastic base.

In a conventional servo track signal writing apparatus, the side surface of a magnetic head arm is pressed with a pressure of about 10 gram by a pushrod press method. In this embodiment, however, servo control is so performed as to hold the force constant such that the side surface of the magnetic head arm is moved about 1 $\mu$m with a pressure of about 1 gram.

As long as the cylindrical contact member ROD of the optical force sensor unit PS is in contact with the side surface of the magnetic head arm ARM1 or with the side surface of the slider SLID, the distance between the mirror and the internal interference optical apparatus is changed by the contact force. When the cylindrical contact member ROD is contacting the side surface of the magnetic head arm ARM1 or the side surface of the slider SLID, the internal cylindrical concave mirror M of the force sensor is moved by the contact pressure to modulate the phase of the wave front of the reflected light. A change in brightness of the interference light of this reflected light is detected by the internal light-receiving device PD of the optical force sensor unit. By using a change in sine-wave electrical signal, caused by the interference between the reflected light from the cylindrical concave mirror M and the reflected light from the half mirror HM, a change in distance can be detected with a resolution of about 0.01 $\mu$m by a known electric circuit having a resolution by which one sine wave (0.39 $\mu$m) can be divided into several ten phases.

On the basis of this electrical change, the signal processor SP performs feedback control for the current to the voice coil VOIC via a voice coil motor driver VCMD. Consequently, the distance between the half mirror HM and the cylindrical concave mirror M can be held at a fixed value with a resolution of 0.01 $\mu$m. Since the arm ARM1 and the cylindrical concave mirror M are in contact with each other, the distance between the magnetic head arm and the half mirror HM can be indirectly held constant with a resolution of about 0.01 $\mu$m.

That is, when the contact pressure to the arm ARM1 is held constant by controlling the current to the voice coil VOIC, the phase of the reflected light is also in a specific state. The position of the cylindrical concave mirror M is measured by the interference optical system described above, and a current is passed through the voice coil VOIC so that a fixed state is held, thereby performing servo control by which the magnetic head arm ARM1 is moved. Consequently, the magnetic head arm ARM1 can be indirectly finely moved and positioned with a resolution of about 0.01 $\mu$m.

When a portion in contact with the magnetic head arm ARM1 is slightly moved laterally while being rotated, the force can vary and become unstable due to the influence of the surface roughness of the side surface of the magnetic head arm ARM1 if the contact portion is an acute-angle projection shape. Additionally, the lighter the contact portion to the magnetic head arm ARM1, the higher the ability to contact and follow the magnetic head arm ARM1. As the contact member of this embodiment, therefore, a fine cylindrical thin member on the inner surface having a reflecting surface is adhered to the circumferential surface of the columnar glass probe OP such that the curvatures of the two members are substantially the same. Consequently, both a high contact stability and a light weight of the contact member are achieved.

By using the above components, non-contact fine positioning is performed by the following procedures.

First, the optical non-contact distance sensor unit PS is fixed to an initial position by using the external motor MO and the rotary encoder RE. Subsequently, a current is passed through the voice coil VOIC to bring the optical non-contact distance sensor unit PS into contact with the side surface of the arm ARM1. Consequently, the optical force sensor unit PS outputs a periodic signal indicating that a distance x between the internal mirror and the interference optical system main body is changing. Assuming the contact force is F and the elastic constant of the elastic base EB is k, the current to the voice coil VOIC is so controlled that the mirror comes to a position x where x=F/k holds.

Subsequently, under the control of the signal processor SP, the optical non-contact distance sensor unit PS is rotated through a minute angle by using the external motor MO and the rotary encoder RE. Consequently, a signal indicating that the contact force between the optical force sensor unit PS and the magnetic head arm ARM1 or the slider SLID has changed is output.

Accordingly, the current to the voice coil VOIC fixed to the base of the magnetic head arm ARM1 is changed to rotate the magnetic head arm. The optical force sensor unit PS outputs a signal indicating that the contact force is again changing. If it is determined on the basis of the signal from the optical force sensor unit PS that the initial state is restored, the mutual contact force has returned to the original state. At this timing, the control current to the voice coil VOIC is stopped.

By repeating the above procedures at a high speed, the magnetic head arm ARM1 (the slider SLID) can be finely fed and accurately positioned in a non-contact state in synchronism with accurate positioning and fine feeding of the optical force sensor unit PS. With this arrangement, a high-density servo track signal writing apparatus can be realized by repetitively writing a servo track signal in the hard disk for each stoppage. Note that an actual positioning procedure need not be performed by the divided procedures as described above. That is, the magnetic head arm may also be moved so as to follow the movement of the optical force sensor unit on the basis of an optimum control theory.

In the above embodiment (FIGS. 15, 16, 17, and 18), the half mirror HM and the cylindrical concave mirror M are used to constitute a Fizeau interferometer type interference distance measuring apparatus and measure the force (i.e., distance) with a high resolution. However, a Michelson interference optical system and the like may also be used.

Also, the cylindrical contact member ROD as a portion of the force sensor PS in contact with the magnetic head arm ARM1 may be formed by winding a film-like reflecting member on an elastic adhesive layer formed on the circumferential surface of the columnar glass probe OP.

Modifications of the second embodiment will be described below. In the following explanation, the parts except for the optical force sensor unit PS are the same as in the second embodiment. Therefore, only the optical force sensor unit PS will be described below with reference to the accompanying drawings, and the rest will be omitted.

Figure 20:
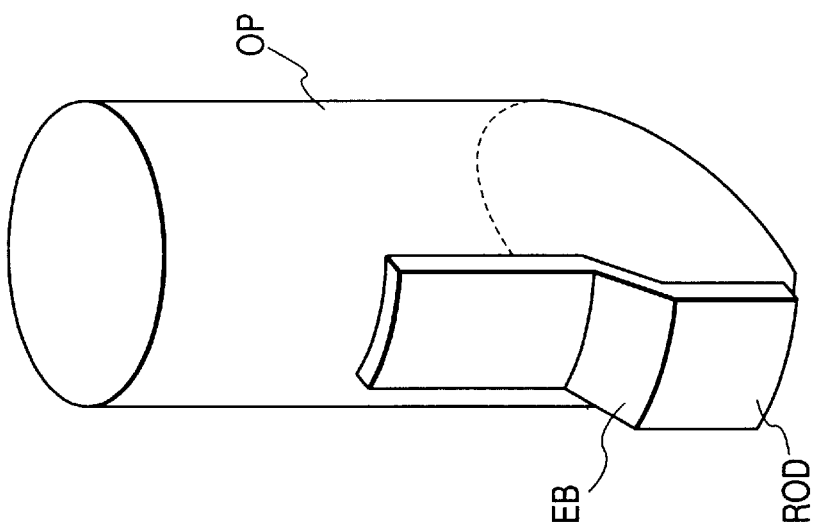
FIG. 20 is a perspective view of an optical probe in another modification.
Figure 19:
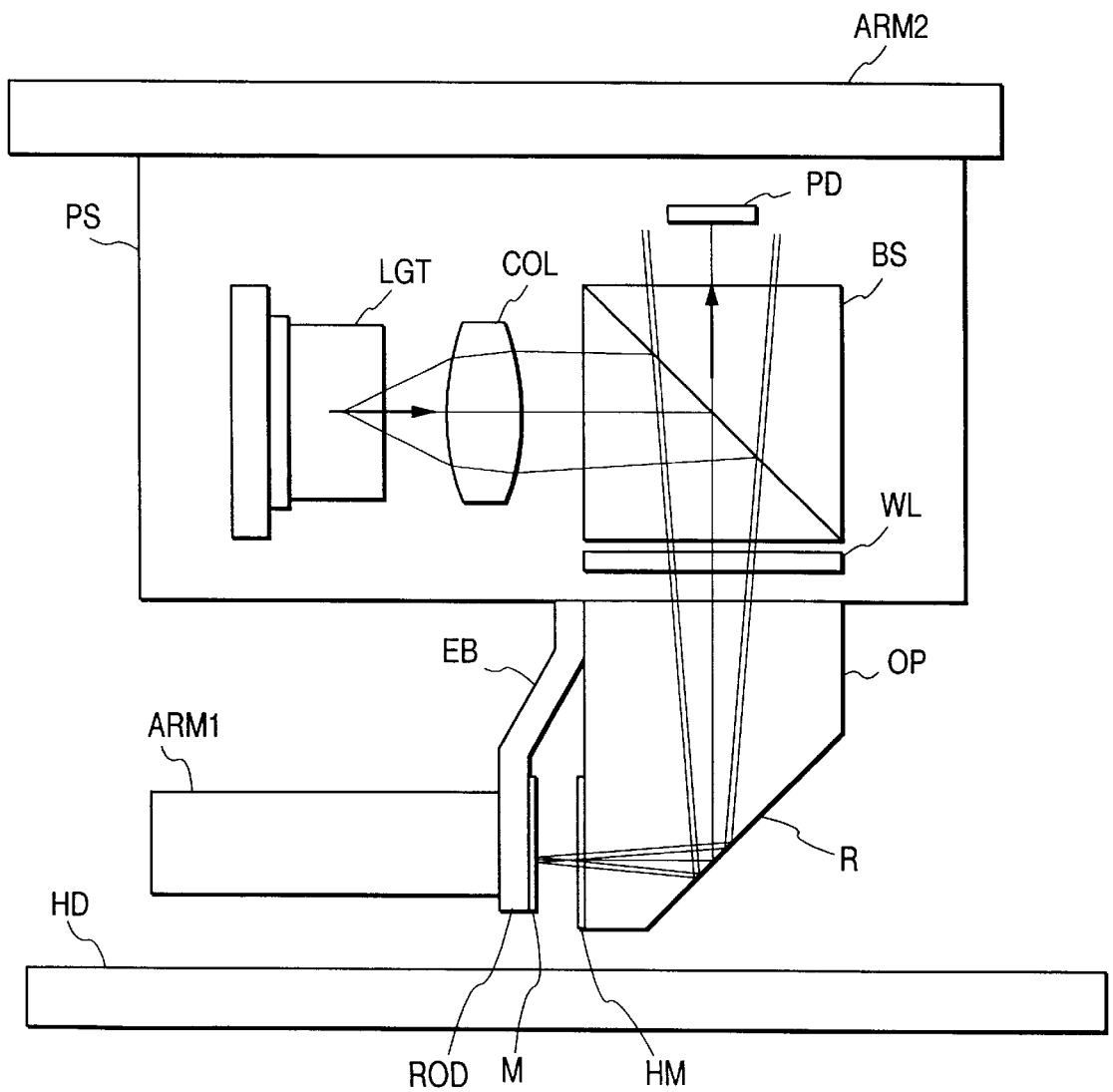
FIG. 19 is a schematic side view of a force sensor unit in one modification.

FIGS. 19 and 20 are a schematic side view and a perspective view, respectively, of a modification in which the elastic support member EB of the force sensor PS is a leaf-spring member whose one end is bonded to the circumferential surface of a columnar glass probe OP and other end is connected to the cylindrical contact member ROD.

Note that the shape of the leaf spring shown in FIGS. 19 and 20 is merely an example and can be changed in accordance with the specifications.

Figure 22:
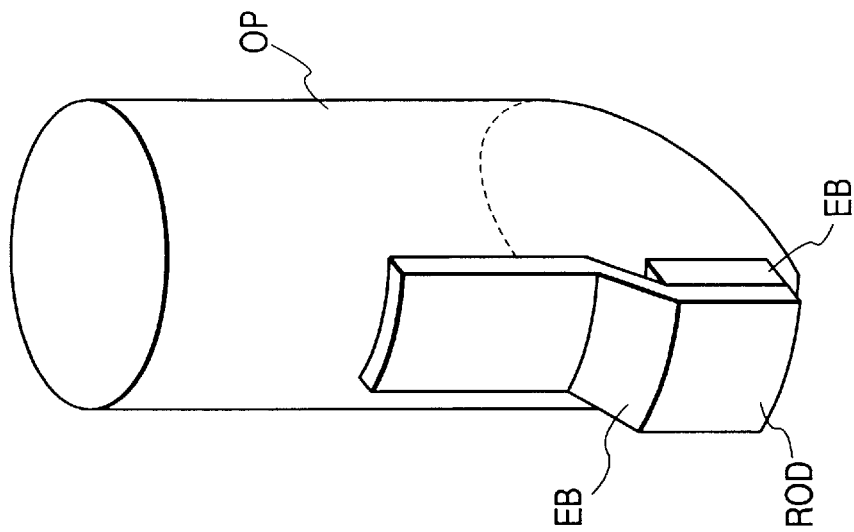
FIG. 22 is a perspective view of an optical probe in still another modification.
Figure 21:
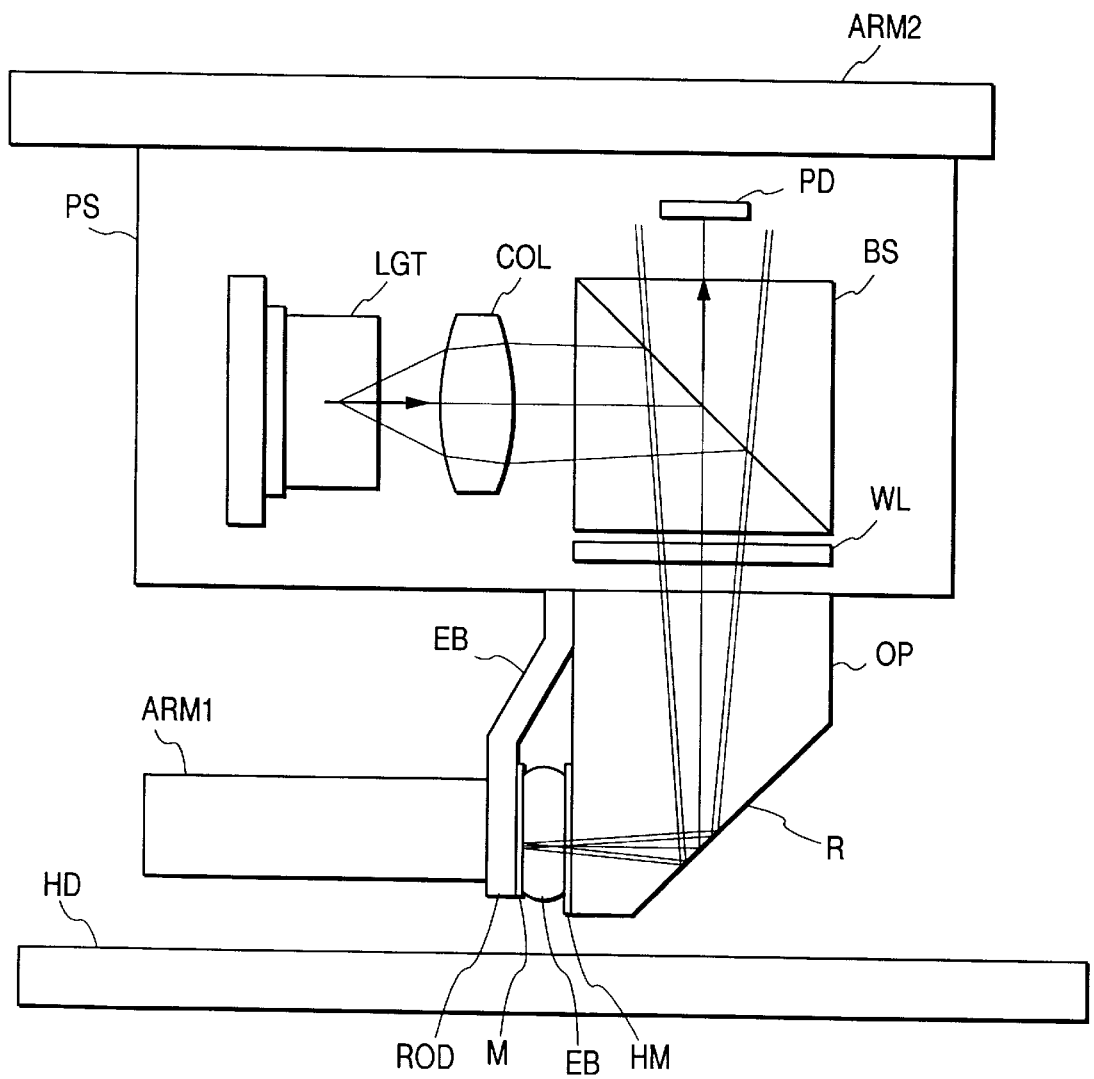
FIG. 21 is a schematic side view of a force sensor unit in still another modification.

FIG. 21 is a schematic side view of a modification in which an elastic base EB of the force sensor PS is formed by using both the leaf-spring member shown in FIG. 19 and the resin member shown in FIG. 16. FIG. 22 is a perspective view of an optical probe of the modification. The leaf-spring member gives an appropriate elastic constant and suppresses an unnecessary horizontal displacement of the mirror. The elastic resin suppresses an unnecessary resonance mode.

The following various effects are obtained by the above embodiment and its modifications.

(1) Since the position of the slider can be measured and determined with a slight contact, no unnecessary stress is applied to the magnetic disk arm ARM1 and the support arm ARM2 of the force sensor unit. Therefore, servo track signals on a hard disk can be stably recorded.

(2) Since the optical force sensor using interference of light as its principle is used, the position of the slider can be measured with a high accuracy and a high resolution. Therefore, servo track signals on a hard disk can be recorded by a high density.

(3) The optical force sensor for measuring the position of the slider is supported by the optical probe from a portion above a hard disk plate. Therefore, as in conventional apparatuses using a pushrod, servo track signals can be written by forming an arcuated window in the upper surface of the hard disk drive HDD and inserting the optical probe OP. Accordingly, it is unnecessary to add any special structure to the hard disk drive or limit the arrangement of an electronic substrate so as not to intercept light beams.

(4) Since positioning is basically performed by contact with the magnetic head arm, it is unnecessary to add any special part or structure to the magnetic head arm and the hard disk drive. Accordingly, the present invention is applicable to magnetic head arms having various sizes and shapes.

What is claimed is:

1. An apparatus for detecting position change information of an object, comprising:
    a contact member that mechanically contacts the object so as to be displaced by a change in force applied from the object; and
    a detecting unit for obtaining position change information of the object by detecting a change in force applied from the object to said contact member, said detecting unit detecting a change in force applied from the object by detecting a change in position of said contact member utilizing interference light of light passed through at least one of said contact member and a member integrally provided on said contact member by use of an interferometer.

2. An apparatus according to claim 1, wherein said contact member has a cylindrical surface, and said cylindrical surface comes in contact with the object.

3. An apparatus according to claim 1, wherein said detecting unit optically detects a change in force applied from the object to said contact member.

4. An apparatus according to claim 1, wherein said contact member can pivot about substantially the same rotational axis as pivoting of the object, and said detecting unit obtains rotational position change information of the object.

5. An apparatus for positioning an object, comprising:
    a contact member that mechanically contacts the object so as to be displaced by a change in force applied from the object; and
    a position control system for positioning the object by moving said contact member while controlling a position of the object such that a change in force applied from the object to said contact member is canceled, said position control system detecting a change in force applied from the object by detecting a change in position of said contact member utilizing interference light of light passed through at least one of said contact member and a member integrally provided on said contact member by use of an interferometer.

6. An apparatus according to claim 5, wherein said contact member has a cylindrical surface, and said cylindrical surface comes in contact with the object.

7. An apparatus according to claim 5, wherein said position control system has a detecting unit for optically detecting a change in force applied from the object to said contact member, and positions the object on the basis of the detection result from said detecting unit.

8. An apparatus according to claim 5, wherein said contact member can pivot about substantially the same rotational axis as pivoting of the object, and said position control system performs rotational positioning for the object.

9. An apparatus for recording information on a hard disk of a hard disk drive having internal magnetic head arm means, comprising:

an arm member so arranged as to pivot about substantially the same rotational axis as said magnetic head arm means;

a contact member provided on said arm member to contact with said magnetic head arm means;

a detecting unit for detecting a change in force applied from said magnetic head arm means to said contact member;

a position control system for controlling a rotational position of said magnetic head arm means in a direction in which the detection result from said detecting unit is canceled;

a pivoting control system for controlling a rotational position of said arm member to control a position of said magnetic head arm means; and a signal system for transmitting a signal, by which a magnetic head records information on a hard disk, to said magnetic head.

10. An apparatus according to claim 9, wherein said detecting unit has an optical sensor using interference of light.

11. An apparatus according to claim 10, wherein said detecting unit is so designed that a light beam is split into two light beams by a beam splitter, one light beam is guided to said contact member and made to interfere with the other light beam, and resultant interference light is received by a photoelectric device.

12. An apparatus according to claim 10, wherein said detecting unit is so designed that a light beam is incident on a diffraction grating scale provided on the side of said contact member to generate diffracted light beams having different diffraction orders, the diffracted light beams are made to interfere with each other and converted into a brightness signal, and the brightness signal is received by a photoelectric device.

13. An apparatus according to claim 9, wherein said contact member has a cylindrical surface, and said cylindrical surface comes in contact with said magnetic head arm means.

14. An apparatus according to claim 13, wherein said detecting unit has an optical sensor using interference of light.

15. An apparatus according to claim 14, wherein said detecting unit is so designed that a light beam is split into two light beams by a beam splitter, one light beam is guided to said contact member, reflected by an inside of said cylindrical surface, and made to interfere with the other light beam, and resultant interference light is received by a photoelectric device.

16. An apparatus according to claim 14, wherein said detecting unit is so designed that a light beam is focused into the form of a spot or line, fed into and reflected by a cylindrical concave mirror formed on the inside of said cylindrical surface of said contact member, and made to interfere with another light beam, resultant interference light is converted into a brightness signal, and the brightness signal is received by a photoelectric device.

* * * * *

UNITED STATES PATENT AND TRADEMARK OFFICE
CERTIFICATE OF CORRECTION

PATENT NO.    : 6,151,185
DATED         : November 21, 2000
INVENTOR(S)   : Kou Ishizuka et al.

Page 1 of 1

It is certified that error appears in the above-identified patent and that said Letters Patent is hereby corrected as shown below:

Column 1
Line 31, "parallelpiped" should read -- parallelepiped --.

Column 2,
Line 5, "ARM1" should read -- ARM1', --.

Column 7,
Line 21, "R-," should read -- R--, --.
Lines 29 and 31, "R-" should read -- R-- --.

Column 8,
Line 47, "Oth-order" should read -- 0th-order --.

Column 9,
Lines 3, 21, 30 and 32, "R-" should read -- R-- --.

Column 10,
Line 50, "ten" should read -- tens of --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*